United States Patent [19]

Palmer

[11] 4,301,543
[45] Nov. 17, 1981

[54] FIBER OPTIC TRANSCEIVER AND FULL DUPLEX POINT-TO-POINT DATA LINK

[75] Inventor: John P. Palmer, Pomona, Calif.

[73] Assignee: General Dynamics Corporation, Pomona Division, Pomona, Calif.

[21] Appl. No.: 123,036

[22] Filed: Feb. 20, 1980

[51] Int. Cl.³ .............................................. G02B 5/14
[52] U.S. Cl. .................................. 455/612; 455/607; 350/96.15
[58] Field of Search ............... 350/96.15, 96.16, 96.22, 350/96.23; 455/601, 606, 607, 612, 610

[56] References Cited

U.S. PATENT DOCUMENTS

| | | | |
|---|---|---|---|
| 2,100,348 | 11/1937 | Nicolson | 250/7 |
| 2,187,908 | 1/1940 | McCreary | 250/7 |
| 2,530,580 | 11/1950 | Lindenblad | 343/100 |
| 3,272,988 | 9/1966 | Bloom et al. | 455/601 |
| 3,351,761 | 11/1967 | Hamby et al. | 455/608 |
| 3,654,473 | 4/1972 | Nussmeier | 455/608 |
| 3,933,410 | 1/1976 | Milton | 350/96.16 |
| 4,054,366 | 10/1977 | Barnoski et al. | 350/96.15 |
| 4,056,719 | 11/1977 | Waaben | 455/601 |

FOREIGN PATENT DOCUMENTS 1429875  6/1973  United Kingdom ............... 455/600

OTHER PUBLICATIONS

"Electronics" Directional Couplers Send TV Signals Down Single Optical-Fiber Cable, p. 70, 9-14-1978.

*Primary Examiner*—Robert L. Richardson
*Assistant Examiner*—Edward L. Coles
*Attorney, Agent, or Firm*—Henry M. Bissell; Edward B. Johnson

[57] ABSTRACT

A full duplex data link for use between two transceiver terminals utilizing a single optical fiber for data transmission. The respective transmitters and receivers are coupled to the optical fiber utilizing a directional coupler in which the two fibers are of different diameters, the smaller fiber is the input fiber, and directional coupling is effected by joining a flat elliptical face formed on a curved section of the larger fiber and a flat elliptical face formed by severing the smaller fiber at an angle to the axis thereof.

16 Claims, 4 Drawing Figures

FIBER OPTIC TRANSCEIVER AND FULL DUPLEX POINT-TO-POINT DATA LINK

BACKGROUND OF THE INVENTION

1. Field of the Invention

The present invention relates to full duplex data transmission between two transceiver terminals. In particular, the present invention relates to data transmission utilizing a single optical fiber to connect a pair of transceivers wherein transmission from each transceiver is obtained by coupling a light signal to the single fiber with a specific type of directional coupler.

2. Description of the Prior Art

Conventional data transmission is normally achieved by utilizing metal wire transmission lines such as twisted wire pairs or coaxial cables. The lines are connected between two terminals at either end of a data link. Such links are capable of carrying transmission in one direction only at a given point in time because of the nature of the propagation of electrical current. Bidirectional transmission, i.e. transmission in both directions over a single wire or data link, can only be approximated in wire transmission lines by the interruption of the transmission from a given terminal to allow transmission from the other terminal or by duplication of communication paths. This transmission on a time-sharing basis decreases the overall rate of information transfer by at least 50% as compared to continuous data transmission. In addition, timing for this time-sharing format is critical in order to achieve the proper send and receive synchronization and thus a considerable amount of electronic circuitry must be devoted to the timing and synchronization functions.

The prior art suggests several methods of transmitting and receiving optical communications in order to obtain continuous bidirectional transmission. For instance, light beam communication systems have been suggested for many years. In U.S. Pat. No. 2,100,348 of Nicolson and U.S. Pat. No. 3,351,761 of Hamby et al., transmission systems are described which utilize light, but not optical fibers. That is, the light is focused through lenses and transmitted through the atmosphere.

Sick in British patent specification No. 1,429,875 suggests an alternate method wherein a focusing system and dichroic mirrors are utilized. The dichroic mirrors are used as beam splitters and bend the light transmitted through the atmosphere. In another system Nussmeier in U.S. Pat. No. 3,654,473 suggests the use of a laser beam which is polarized and phase modulated with information. The two perpendicular components of the polarized laser signal are used for the bidirectional transmissions.

Wavelength multiplexing and frequency multiplexing in order to avoid the time-sharing problem also requires considerable circuitry.

Continuous bidirectional data transmission has been performed using microwave waveguides and directional couplers. In these systems signals from both transmitters are coupled simultaneously and in opposite directions into a transmission line waveguide by way of two directional couplers. The directional property of the couplers prevents mixing of the two signals at the receivers; consequently the receivers cannot receive from their related transmitters, but may only receive from the remote transmitter. Optical fibers, on the other hand, have waveguide characteristics in that they can transmit two signals in opposite directions without interference in a manner similar to microwave waveguides. However, optical fibers, as opposed to microwave waveguides, are not necessarily single-mode waveguides. Thus, optical fiber systems using directional couplers allow manufacturing of multimode devices. Also, the systems are capable of transmitting signals and wavelengths throughout the visible and near infrared spectra.

It has now been suggested that directional couplers be utilized to transmit television signals on a single optical fiber cable (see Sept. 14, 1978 issue of *Electronics*, page 70). The suggested system, however, utilizes standard directional couplers which have a 3 dB loss inherent in the splitting of the signals. These conventional couplers divide the light in half, with half of the signal from the remote transmitter being transmitted to the adjacent receiver, and the remaining half being transmitted to the associated receiver. Thus this type of system inherently loses half of its power.

SUMMARY OF THE INVENTION

The present invention consists of two transceivers connected by a single optical fiber. The transceivers are capable of simultaneously sending and receiving optical signals which are transmitted in opposite directions through the optical fiber transmission line. A single transceiver has a sender, a receiver and a directional optical coupler. The sender includes an electronic driver and a light generator, such as either a light-emitting diode (LED) or an injection laser diode (ILD). The driver receives the electronic signal from, for instance, television or computer terminal electronics and provides a corresponding electronic signal of appropriate magnitude for the signal generating diode. The particular driver and type of diode are not of great significance, so long as the whole of the system is compatible, i.e. the electronic signal provided by the driver is compatible with the operating tolerances of the diode, and the signal production by the diode is appropriate for the actual use.

The receiver consists of a photodiode, a pre-amplifier, a post-amplifier and a level detector. The photodiode can be, for instance, a PIN photodiode, an avalanche photodiode or other appropriate photodiode. The pre-amplifier, post-amplifier and level detection circuitry must also be designed to be compatible with the particular system utilized. The particular circuitry utilized is not always critical; however, it has been found that the circuitry illustrated herein functions very well. The optical signal is converted into an electrical signal by the photodiode at a relatively low signal level. It is then amplified by the transimpedance amplifier, and is further amplified by, for example, an emitter coupled logic line receiver functioning as a post-amplifier. The output signal from the post-amplifier includes a low-level signal from the transmission section of the same transceiver which is partially reflected into the receiver by the directional coupler. Thus, a level discriminator at the output of the post-amplifier should be utilized in the present apparatus. The level discriminator causes the receiver to ignore the unwanted reflected signal. Typically the signal reflected by the directional coupler is −20 dB lower than the signal transmitted in the proper direction through the directional coupler; nevertheless, the low-level reflected signal could possibly interfere with the desired received signal and thus the level discriminator is utilized.

The couplers utilized in the apparatus of the present invention are described in detail in applicant's copending application Ser. No. 123,034, filed concurrently herewith, entitled OPTICAL FIBER LAUNCH COUPLER and assigned to a common assignee. The couplers are unidirectional and have one port which functions solely as an input port, one that functions solely as output port and a third bidirectional port, i.e. it may function both as an input and output port. The bidirectional port and the output port constitute a continuous throughput fiber. They are formed of a continuous, single-strand, optical light-tube fiber. The single throughput fiber may be joined in an end-to-end relationship with another fiber by conventional couplers in order to vary the length of the transceiver to tranceiver line if desired. The second input port is formed by the different single-strand fiber of significantly smaller diameter than the throughput fiber, and terminates at the junction with the throughput fiber. The coupler is produced by mounting the fibers on preselected curved surfaces with the use of a resin, such as an epoxy resin. The throughput fiber has a flat surface of a preselected surface area lapped into it, with the lapping going through the outer glass cladding, and not the whole of the fiber. The smaller launch fiber is also lapped. However, the lapping is effected to the point that the core of the launch fiber is completely severed. The thickness of the smaller launch fiber and the radius of curvature of the arcuate surface on which it is mounted result in a specific elliptical flat surface area being produced. This surface area is selected to provide the desired coupling. The two lapped surfaces are then mounted together so that the exposed core section of the throughput fiber meshes with one of the core sections of the severed launch fiber. The coupler is then completed by adhering the two units together with an optically transparent epoxy resin.

In utilizing these couplers in the apparatus of the present invention, the conventional 3 dB loss of directional couplers does not occur. More specifically, the throughput loss, i.e. the loss for a signal transmitted inward from the bidirectional port and outward through the output port, can be as low as about 0.01 dB, corresponding to a loss of about 0.23% of the signal transmitted. When coupling is effected through the input port, the insertion loss is approximately 1.5 dB, corresponding to about 29% of the signal being launched; however, losses down to about 1 dB or about 10% are possible utilizing these couplers.

Thus the present invention provides a means for full-duplex communications between two terminals on a point-to-point link. The full duplex operation can be performed with or without wavelength multiplexing, and it can be performed with or without frequency multiplexing. Furthermore, the full duplex communications link does not require time-division-multiplexing of the two-way communication signals.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

The description of the preferred embodiments contained herein will be in terms of visible light signal transmission and reception. However, it is to be understood that the apparatus of the present invention is equally suitable for use with, for instance, near infrared light, or light of only portions of the visible spectrum. In addition, the full duplex communication can be effected with wavelength multiplexing or without it and can also be effected with or without frequency multiplexing. Thus in its described form, the present invention requires minimal circuitry and expense. However, in the alternative, with further circuitry and multiplexing, the apparatus of the present invention can be used to carry multiple signals, and yet still function with a minimum amount of signal loss.

Figure 1:
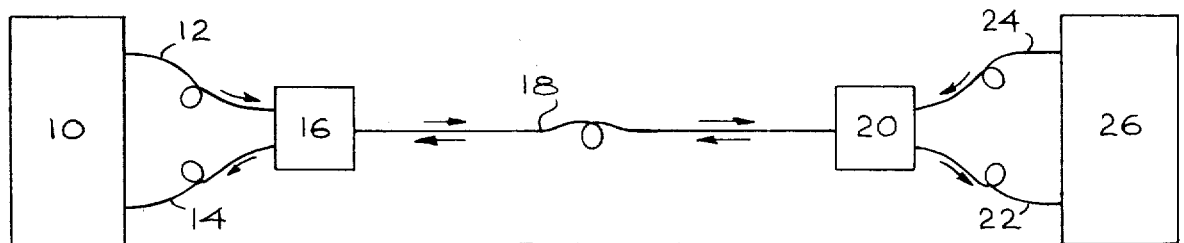
FIG. 1 is a schematic of the duplex transmission system of the present invention.

In FIG. 1, transceiver 10 is provided with output optical fiber 12 and input optical fiber 14. Optical fibers 12 and 14 are coupled at directional coupler 16 with transmission optical fiber 18 which is capable of transmitting signals in a bidirectional mode. The signals generated at transceiver 10 and communicated to coupler 16 through output line 12 are transmitted to fiber 18 and enter second directional coupler 20, where they are directly transmitted to transceiver 26 through input line 22. Signals generated in transceiver 26 are transmitted to coupler 20 through output line 24, pass through transmission fiber 18, into coupler 16 and directly to transceiver 10 through transceiver input fiber 14.

Figure 2:
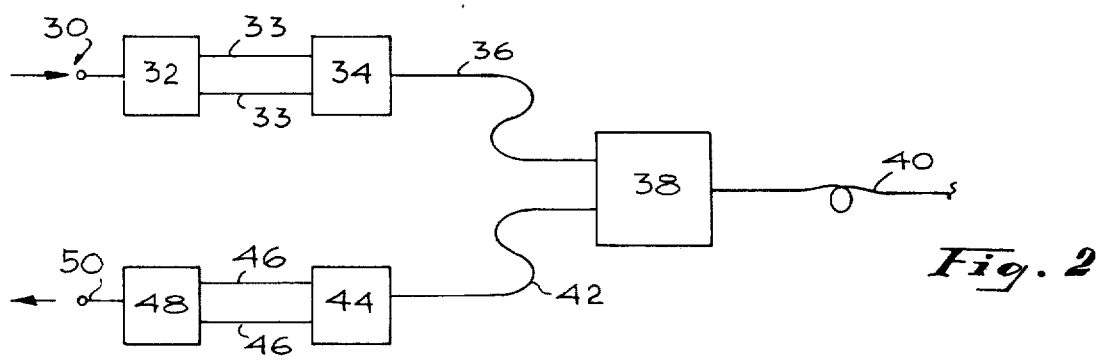
FIG. 2 is a schematic of one end of the duplex transmission system showing the transmission and receiving functions.

In FIG. 2, the transceiver is shown in more detail. For transmission, signals provided to driver 32 through line 30 are appropriately converted and transmitted to a light-emitting diode unit 34 by the use of lines 33. Driver 32 is designed such that the signal provided to it is appropriately converted for the desired power characteristics depending upon the nature of the light-emitting diode. The system is capable of utilizing light-emitting diodes, or in the alternative injection laser diodes, the important factor being that the driver provides a signal of appropriate magnitude for the selected diode. An exemplary diode driver is manufactured by Spectronics, Inc. as model 2144. This driver can be coupled with RCA light-emitting diode model C-30133. In this system the LED is attached to a "pigtail" optical fiber by the manufacturer. The preferred optical fiber is a Galileo Electro-Optics, Inc. fiber model Galite 3000.

The optical signal produced by the diode is coupled to input fiber 36 and enters coupler 38 for transmission through bidirectional fiber 40. The exact structure will be described hereinbelow. For the reception function, bidirectional fiber 40 carries a signal to coupler 38 which transmits the signal to input line 42, in the manner described hereinbelow. The signal in input line 42 is then provided to sensor 44 which is a photodiode. The photodiode converts the light signal into an electrical signal. An exemplary photodiode is RCA model C-30808 which is a PIN photodiode. Other types of photodiodes, such as avalanche photodiodes, would also be equally appropriate. Some of the considerations used in determining which type of photodiode is to be used are the signal level desired at the receiver, the circuitry in the receiver and the signal levels available at the output.

The electrical signal generated by the photodiode, contained in receiver unit 44, is transmitted to amplifier unit 48 through lines 46 and, after amplification in unit 48, is transmitted through line 50 for ultimate use.

Figure 3:
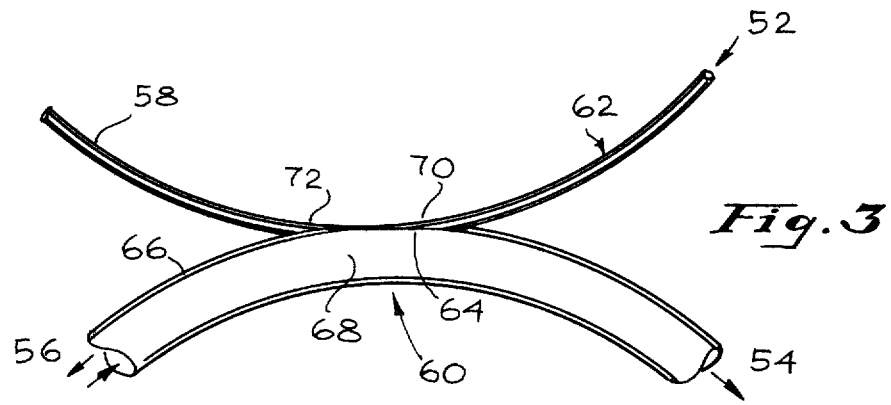
FIG. 3 is a schematic of the directional coupler used in the present invention.

Amplification unit 48 usually contains a pre-amplifier and post-amplifier as well as a level detector. The low-level signal produced by the photodiode is, for example, amplified first by a transimpedance amplifier, and then by an emitter coupled logic line receiver which functions as a post-amplifier. Since the output signal from the post-amplifier includes a low-level signal from the sender section (caused by slight coupling of the signals at directional coupler 38) a level discriminator at the output of the post-amplifier is needed. The level discriminator causes the receiver to ignore the unwanted reflected signal. Typical signal reflection in the directional coupler described in FIG. 3 is −20 dB lower than the signal transmitted from input line 36 to bidirectional line 40 by coupler 38. Nevertheless, this very low-level reflected signal could interfere with the desired receiver signal in subsequent stages of the terminal if signal discrimination were not provided.

An alternative means for signal discrimination is to use optical sources which provide separate and distinct optical wavelengths. For example, an RCA C-30133 light-emitting diode which transmits at a center wavelength equal to about 820 nanometers could be used at diode 34, and at the corresponding other end of the circuit of the present invention, an RCA C-30116 LED which transmits at a center wavelength of about 1060 nanometers could be used. In this manner the first receiver would be equipped with optical filter in front of the photodiode which has a narrow window for optical transmissions at 1060 nanometers, and the second receiver would have a similar optical filter which would transmit at 820 nanometers. Thus the receivers would reject the inappropriate reflected signals. This form of wavelength discrimination would eliminate the need for the level detector described above, and the wavelength discrimination would allow for very weak signals to be utilized, such as would occur when the signal is transmitted over a very long distance, i.e. greater than about 1 kilometer. In the alternative, weak signals often occur when a large number of connectors or branching components are present which would cause significant signal attenuation. However, this additional equipment is not necessary when only one type of light-emitting diode is utilized in the apparatus of the present invention.

Also, signal discrimination can be obtained by frequency modulating the signals from the two transmitters on a common wavelength carrier. This alternative requires appropriate modulation and demodulation circuitry which is not shown in the present drawings. Also, as noted above, the circuitry is unnecessary when utilizing the basic form of the present invention.

In FIG. 3, a directional launch coupler having an input port 52, an output port 54, and a bidirectional port 56 is shown. Fiber 58 is a portion of the schematic, as it is produced during manufacture of the illustrated coupler, which is described in more detail in applicant's copending application Ser. No. 123,034, filed concurrently herewith. It is not coupled to any other lines and, preferably, no signal is transmitted through it. Bidirectional port 56, and output port 54 are formed of throughput fiber 60 which is a continuous single-strand, optical, light-tube fiber. The fiber is preferably a glass-clad-glass fiber as noted above. Input port 52 is formed with a different single-strand clad of fiber 62 of significantly smaller diameter than the throughput fiber. The core of the input fiber terminates at the junction with throughput fiber 60.

In order to produce the unidirectional coupler used in the present invention, both fibers (which are normally single-strand glass-clad-glass fibers known in the art, such as Galileo 3000 or Galileo 3000 LC [large core] fibers) are mounted on preselected curved surfaces by the use of a resin adhesive. Exemplary resins are the epoxy adhesives. Throughput fiber 60 is provided with a flat surface 64 having a preselected surface area lapped into it. The lapping goes through outer glass cladding 66 and produces a small, flat, elliptical surface in core 68. The particular characteristics of surface 64 will be discussed below. The diameter of throughput fiber 60, and the other physical characteristics thereof are described in more detail in applicant's copending application noted above.

The smaller input fiber 62 is normally up to about 100, usually 5 to 70 microns in core diameter and is also epoxy mounted on an arcuate surface and lapped. The lapping of input fiber 62, however, is effected to the point that the core of the fiber is completely severed. This results in the formation of two small elliptical surfaces 70 and 72 in the fiber. Elliptical surface 70 is related to input fiber 62, and elliptical surface 72 is related to unused fiber portion 58. The thickness of the input fiber, and the radius of curvature of the arcuate surface on which it is mounted will produce the elliptical surfaces. The elliptical surface is selected in order to provide the desired coupling.

Lapped surfaces 64 and 70 are mounted together so that only exposed core section 70 of input fiber 62 comes into direct contact with the exposed core surface of the throughput fiber 60. The lapping of larger throughput fiber 60 is effected in a manner that produces the exposed flat surface 64 of elliptical shape which has a surface area approximately equal to the surface area of elliptical surface 70 of input fiber 62. The importance of these characteristics must be emphasized, as it is the matching of these two surfaces that aids in the production of the improvements of the present invention. That is, the severance of the input fiber results in almost all of the light which is transmitted through input fiber 62 being transferable to throughput fiber 60. This transfer occurs at different points due to the curvature and the elliptical shape of the fiber. Alternatively, the small flat surface cut in throughput fiber 60 results in a minimum loss of transmitted light across the throughput fiber itself. The units are then connected so that the transfer occurs only across one end of the input fiber. That is, once completed, only one of the two exposed sections of the input fiber would receive light from the throughput fiber, or transmit light to it. In this manner fiber 58 is not used.

After lapping and polishing are performed on the structures, the fibers are positioned and adhered together with an optically transparent epoxy resin to form the coupler. When this is completed the two curved surfaces of the fiber retainers (not shown), which hold the fibers in the arcuate positions, would be spaced off-center so that the two selected flat surfaces are in full contact.

The removal of the very small amount of glass from the throughput fiber greatly improves the efficiency of the coupler. It is possible to remove such a small amount in view of the fact that the small diameter input fiber has a small coupling surface. In units constructed in accordance with the present invention optical signals travelling in either direction in the bidirectional fiber are transmitted through the coupler in nearly identical intensity and only a very small signal exits the input fiber. However, when an optical signal is placed in the input fiber, almost all of the signal is transferred to the bidirectional end of the throughput fiber. More specifically, the throughput loss in one device has been determined to be approximately 0.01 dB, corresponding to a loss of about 0.23% of the signal transmitted. On the other hand, when coupling was effected, the insertion loss was approximately 1.5 dB corresponding to approximately 25% of the signal launched. Losses down to about 1 dB, or 10% are possible utilizing this structure.

Figure 4:
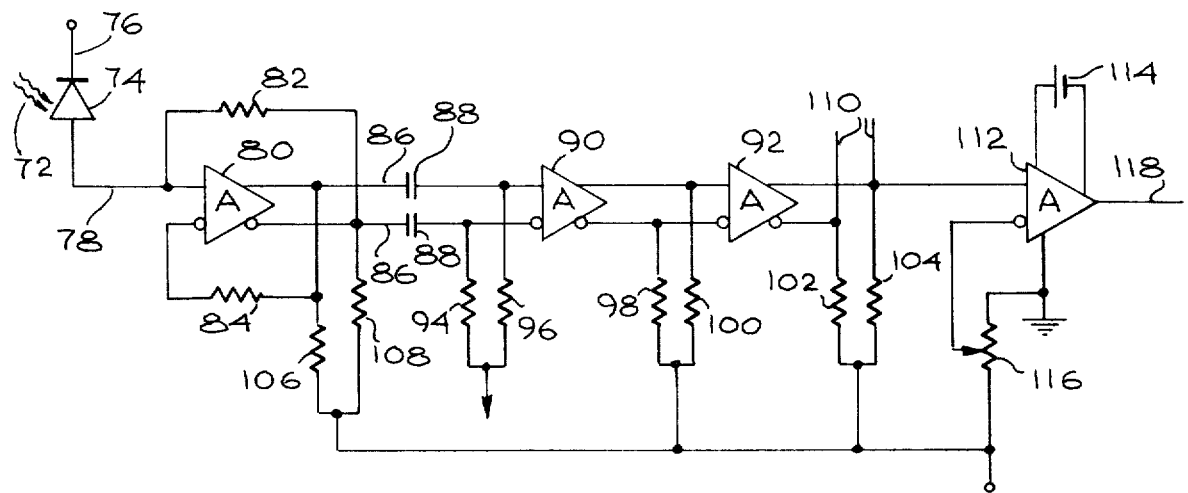
FIG. 4 is the particular signal discrimination amplification circuitry of the present invention.

In FIG. 4, the pre-amplifier, post-amplifier and level detector system used in the present invention is shown. As shown, optical signal 72 is provided to photodiode 74 which has a bias potential supplied to it by line 76. The output signal from the photodiode is transmitted to transimpedance pre-amplifier circuitry through line 78 directed to amplifier 80 which is provided with load and feedback resistors 82, 84, 106, 108 in a known circuit arrangement. The output signal from the pre-amplifier is carried on lines 86 through coupling condensers 88 to conventionally connected post-amplifier circuitry including amplifiers 90 and 92 and resistors 94, 96, 98, 101, 102 and 104. Output lines 110 can be directly connected to an emitter-coupled logic system (not shown) if desired. Low-level discrimination, in addition, is provided through amplifier 112 which includes a threshold potential source 114 and is provided with potentiometer 116. The potentiometer is utilized to remove low-level reflected signals. Output line 118 provides a logic output signal from the circuit.

Although there have been described above specific arrangements of a fiber optic transceiver with full duplex point-to-point data link in accordance with the invention for the purposes of illustrating the manner in which the invention can be utilized to advantage, it will be appreciated that the invention is not limited thereto. For example, although the invention has been disclosed in the context of association with a broad spectrum, visible light system, the principles of the invention are equally applicable to the use of near infrared light, to multiplexing systems and the like. Accordingly, any and all modifications, variations or equivalent arrangements which may occur to those skilled in the art should be considered to be within the scope of the invention as defined in the appended claims.

What is claimed is:

1. A duplex fiber optic data transceiver comprising: means for transmitting data to an input optical fiber; means for receiving data from an output optical fiber; a coupler; and a bidirectional optical fiber; said coupler comprising the termination of the input optical fiber at its junction with a fiber comprising the output optical fiber and the bidirectional optical fiber, the termination of the input optical fiber being a substantially planar elliptical surface at an angle inclined to the axis of the fiber and extending completely through the core of the fiber, the diameter of the output/bidirectional fiber being greater than the input fiber, and the junction with the output/bidirectional fiber being an elliptical planar surface formed on the outside of an arc of said fiber.

2. The transceiver of claim 1 wherein the fibers are glass-clad-glass fibers.

3. The transceiver of claim 1 wherein the transmitting means further includes a light-emitting diode.

4. The transceiver of claim 3 further comprising means for driving the light-emitting diode coupled to a data source.

5. The apparatus of claim 1 further comprising a photodiode in said receiving means.

6. The apparatus of claim 5 further comprising a multiple stage amplifier coupled to the output of the photodiode and means for communicating data from said photodiode to said amplifier.

7. The apparatus of claim 6 wherein the amplifier circuit includes a pre-amplifier and two post-amplifiers.

8. The transceiver of claim 7 further comprising a level discriminator coupled to the amplifier circuit, said level discriminator being effective to eliminate signals from the input optical fiber that are reflected into the output optical fiber and amplified by the amplification circuit.

9. A duplex fiber optic data link system comprising first and second transceiver means coupled by a single bidirectional optical fiber wherein each transceiver means comprises means to transmit data to an input optical fiber, means to receive data from an output optical fiber, and a coupler;

said coupler comprising the termination of the input optical fiber at its junction with a fiber comprising the output optical fiber and the bidirectional fiber, the termination of the input optical fiber being a substantially planar elliptical surface at an angle inclined to the axis of the fiber and extending completely through the core of the fiber, the diameter of the output/bidirectional fiber being greater than the input fiber and the junction on the output/bidirectional fiber being an elliptical planar surface formed on the outside of an arc of said fiber.

10. The system of claim 9 wherein the fibers are glass-clad-glass fibers.

11. The system of claim 9 wherein the means to transmit data further includes a light-emitting diode.

12. The system of claim 11 further comprising means to drive the light-emitting diode coupled to a data source.

13. The system of claim 9 further comprising a photodiode in said means to receive data.

14. The system of claim 13 comprising a multiple stage amplifier coupled to the output of the photodiode and additional means to communicate data from said photodiode to said amplifier.

15. The system of claim 14 wherein the amplifier circuit further includes a pre-amplifier and two post-amplifiers.

16. The system of claim 15 further comprising a level discriminator in said means to receive data, said level discriminator effective to remove signals from the input optical fiber that are reflected into the output optical fiber and amplified by the amplification circuit.

* * * * *